(12) United States Patent
Golin

(10) Patent No.: US 10,273,853 B2
(45) Date of Patent: Apr. 30, 2019

(54) WIRE MESH MIXING TUBE

(71) Applicant: Tenneco Automotive Operating Company Inc., Lake Forest, IL (US)

(72) Inventor: Michael Golin, Dexter, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 14 days.

(21) Appl. No.: 15/719,699

(22) Filed: Sep. 29, 2017

(65) Prior Publication Data

US 2019/0101037 A1 Apr. 4, 2019

(51) Int. Cl.
| | | |
|---|---|---|
| B01F 5/04 | (2006.01) | |
| F01N 3/20 | (2006.01) | |
| F01N 3/28 | (2006.01) | |
| B01D 53/90 | (2006.01) | |
| B01D 53/94 | (2006.01) | |

(52) U.S. Cl.
CPC ............ *F01N 3/2892* (2013.01); *B01D 53/90* (2013.01); *B01D 53/944* (2013.01); *B01D 53/9418* (2013.01); *B01F 5/0451* (2013.01); *F01N 3/2066* (2013.01); *F01N 2610/02* (2013.01)

(58) Field of Classification Search
CPC combination set(s) only.
See application file for complete search history.

(56) References Cited

U.S. PATENT DOCUMENTS

| | | |
|---|---|---|
| 7,380,395 B2 | 6/2008 | Bruck et al. |
| 7,682,705 B2 | 3/2010 | Hodgson |
| 7,980,068 B2 | 7/2011 | Rinaldi |
| 7,981,176 B2 | 7/2011 | Rinaldi et al. |
| 8,359,832 B2 | 1/2013 | Yi et al. |
| 8,635,861 B2 * | 1/2014 | Sun .................. F01N 3/021 60/272 |
| 8,899,022 B2 | 12/2014 | Haverkamp et al. |
| 9,289,724 B2 | 3/2016 | Stanavich et al. |
| 9,291,081 B2 | 3/2016 | Stanavich et al. |

(Continued)

FOREIGN PATENT DOCUMENTS

| | | |
|---|---|---|
| JP | 2009-275541 A | 11/2009 |
| KR | 10-2014-0102123 A | 8/2014 |

OTHER PUBLICATIONS

International Search Report and Written Opinion regarding PCT/US2018/048606, dated Jan. 2, 2019.

*Primary Examiner* — Binh Q Tran
(74) *Attorney, Agent, or Firm* — Harness, Dickey & Pierce, P.L.C.

(57) ABSTRACT

A mixer assembly for mixing an injected reductant with an exhaust gas output from a combustion engine includes an outer housing, a tubular inner housing, and an injector. The outer housing includes an outer wall defining an exhaust gas passageway that can receive exhaust gas. The inner housing is disposed within the outer housing and includes a longitudinal axis, a first end, a peripheral wall, and an outlet. The peripheral wall is at least partially formed by wire mesh. The outlet is disposed at a second end of the inner housing opposite the first end of the inner housing. The injector is fixed to the inner or outer housing to dose the reductant into the interior of the inner housing. The wire mesh includes openings to receive at least a portion of the exhaust gas. The outlet of the inner housing discharges a mixture of exhaust gas and reductant.

20 Claims, 12 Drawing Sheets

(56) References Cited

U.S. PATENT DOCUMENTS

| | | | |
|---|---|---|---|
| 9,352,276 B2 | 5/2016 | Sampath | |
| 9,410,464 B2 | 8/2016 | Hicks et al. | |
| 9,435,240 B2 | 9/2016 | Sampath et al. | |
| 9,957,870 B2 * | 5/2018 | Stelzer | F01N 3/2066 |
| 2003/0079467 A1 * | 5/2003 | Liu | B01F 3/04049 60/286 |
| 2010/0146939 A1 * | 6/2010 | Sim | F01N 3/0256 60/286 |
| 2011/0308234 A1 * | 12/2011 | De Rudder | B01F 3/04049 60/295 |
| 2015/0040537 A1 * | 2/2015 | Hicks | F01N 3/2066 60/273 |
| 2016/0361694 A1 | 12/2016 | Brandl et al. | |
| 2017/0114693 A1 | 4/2017 | Stelzer et al. | |
| 2018/0135487 A1 * | 5/2018 | Vempati | F01N 3/2892 |

* cited by examiner

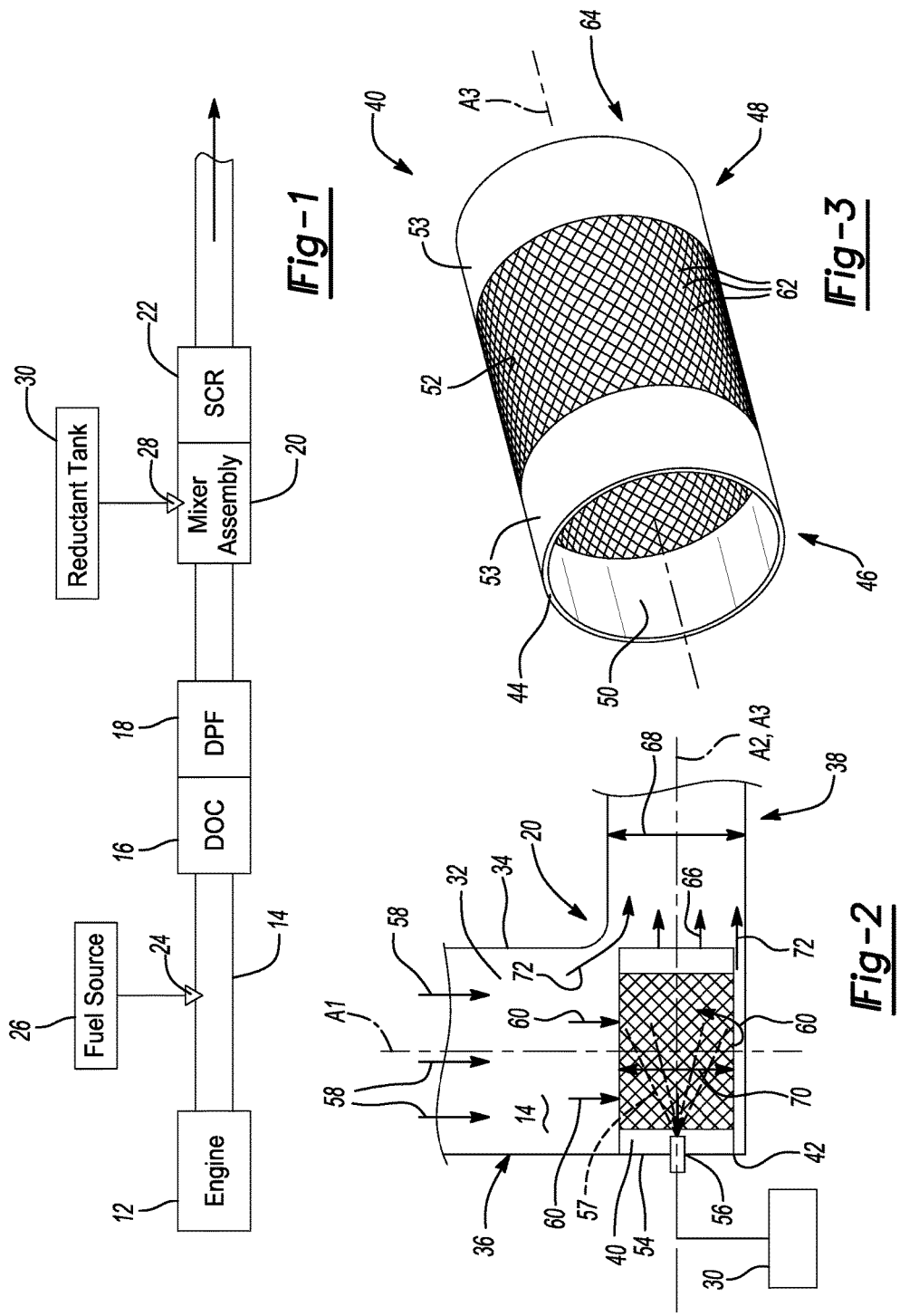

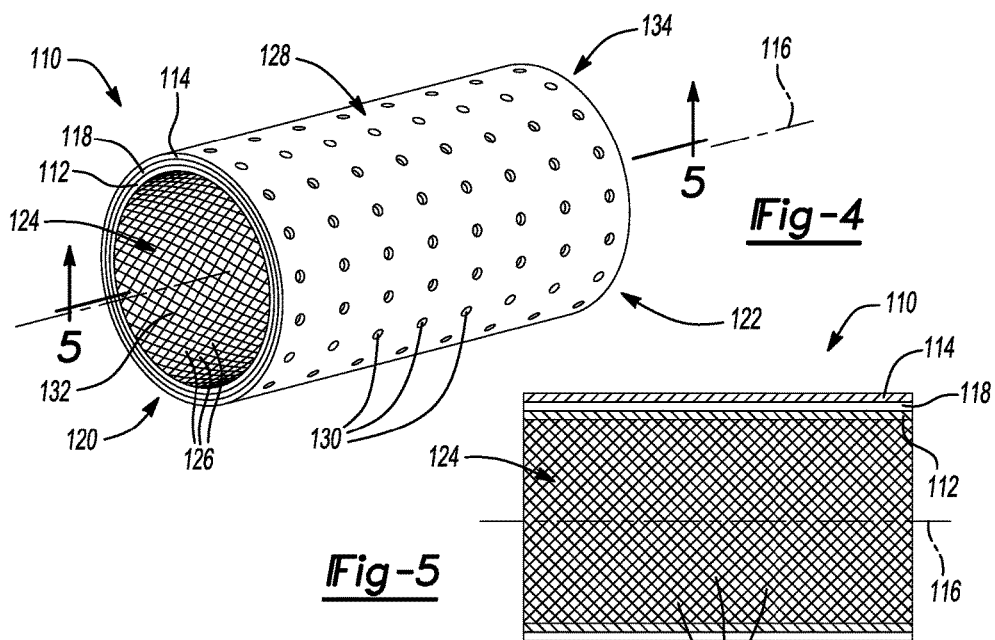
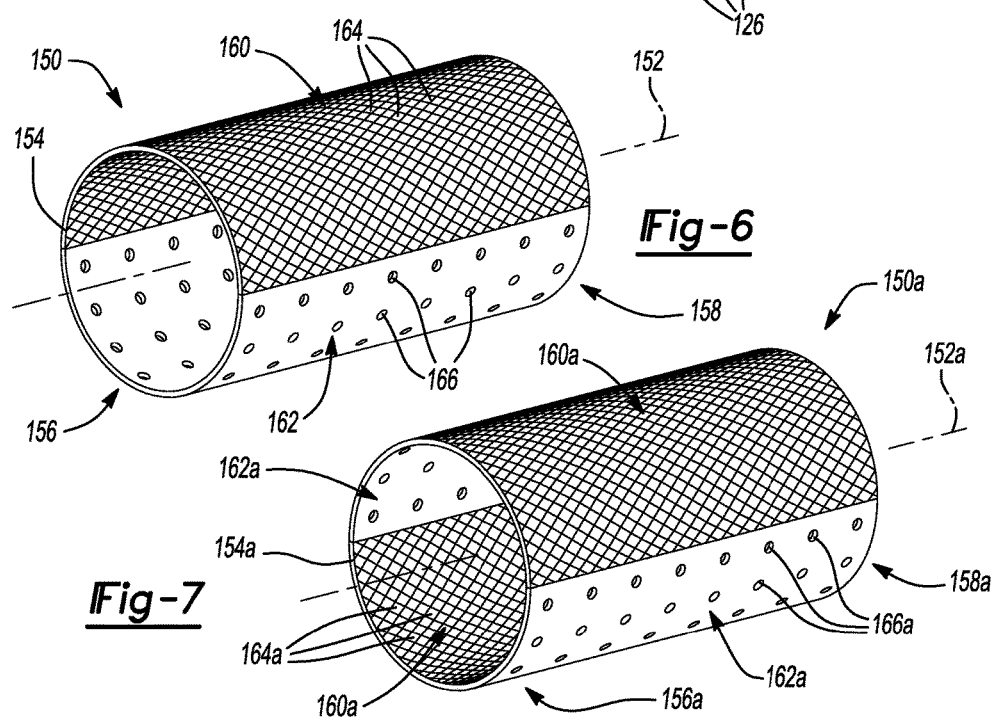

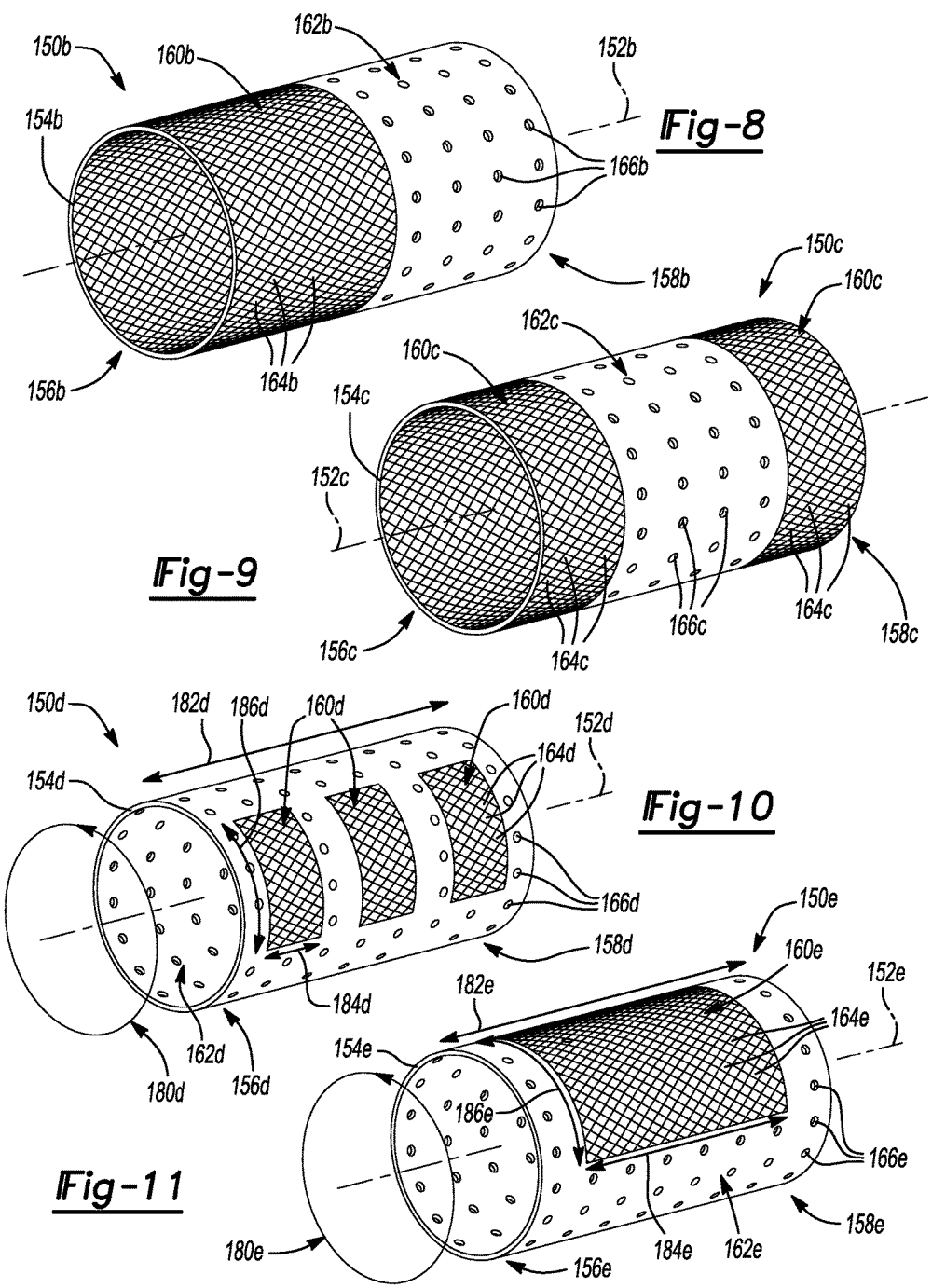

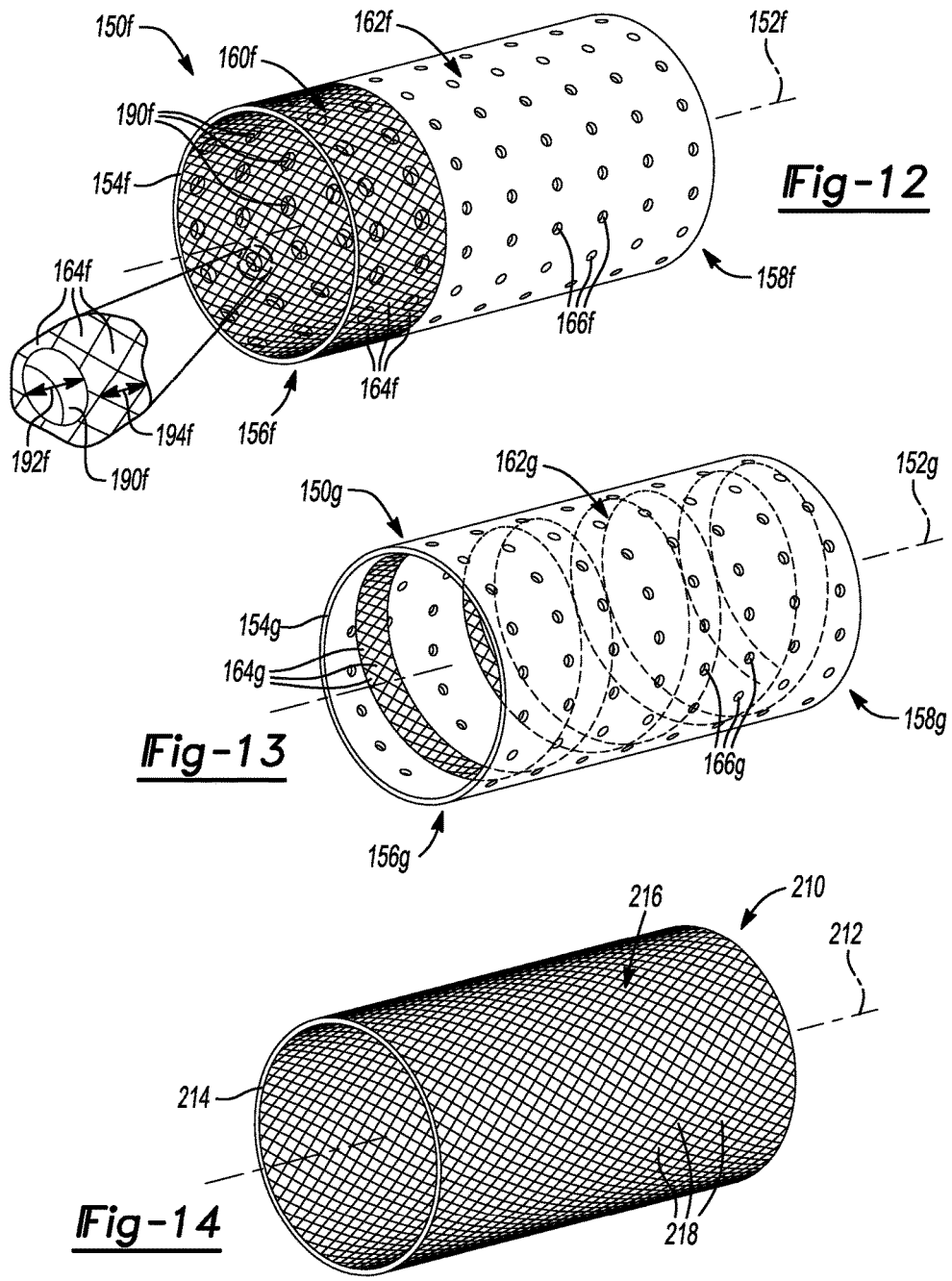

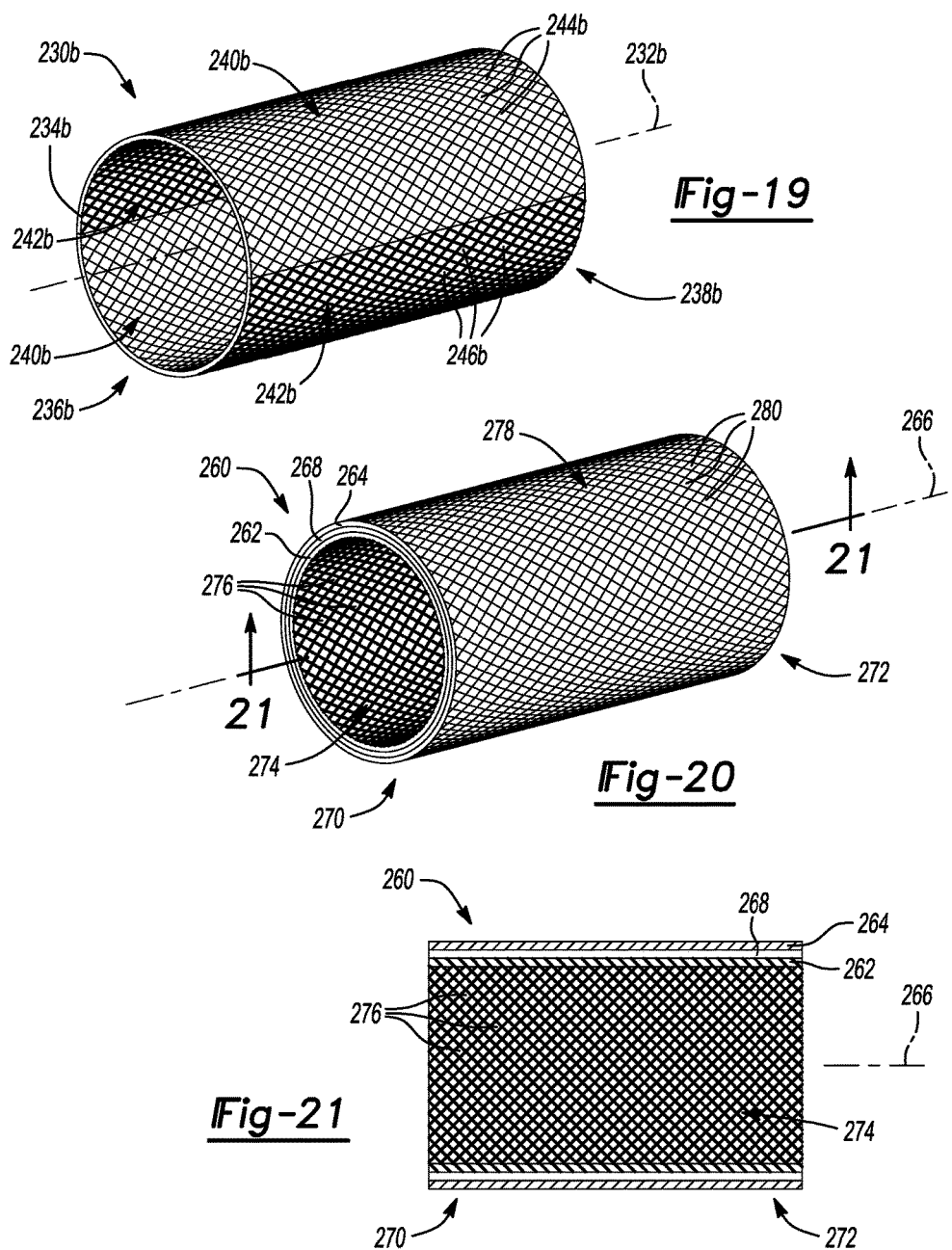

WIRE MESH MIXING TUBE

FIELD

The present disclosure relates to a wire mesh mixing tube for an exhaust aftertreatment system.

BACKGROUND

This section provides background information related to the present disclosure which is not necessarily prior art.

Selective catalytic reduction technology has been used in conjunction with reducing nitrogen oxides present in the exhaust of combustion engines. Many vehicles utilizing combustion engines are equipped with exhaust aftertreatment devices for reducing nitrogen oxide emissions. Some of these systems include a reductant delivery system for transmitting the reductant (e.g., urea or gaseous ammonia) from a tank to the exhaust stream. A mixer may be provided for mixing the injected reductant with the exhaust gas before the reductant reaches a catalyst with which the reductant reacts.

Some mixers may include structures with relatively sharp edges that include a surface roughness as a result of manufacturing. The geometry, including sharp edges, of the known mixers may result in wall film formation which increases the time required to atomize injected reductant. Wall film formation may also lead to urea deposits being formed on the mixer or on an interior wall surface of a conduit in which the mixer is positioned. While these systems may have performed well in the past, it may be desirable to provide an improved mixing system that is able to reduce wall film formation to more efficiently and effectively mix the reductant with the exhaust stream before the mixture reaches a catalyst.

SUMMARY

This section provides a general summary of the disclosure, and is not a comprehensive disclosure of its full scope or all of its features.

In accordance with an aspect of the subject disclosure, a mixer assembly for mixing an injected reductant with an exhaust gas output from a combustion engine includes an outer housing, a tubular inner housing, and an injector. The outer housing includes an outer wall that defines an exhaust gas passageway. The exhaust gas passageway can receive exhaust gas from the engine. The tubular inner housing is at least partially disposed within the outer housing. The inner housing includes a longitudinal axis, a first end, a peripheral wall, and an outlet. The peripheral wall is at least partially formed by wire mesh. The peripheral wall is at least partially defined by an interior of the inner housing. The outlet is disposed at a second end of the inner housing that is opposite the first end of the inner housing. The injector is fixed to one of the inner housing and the outer housing. The injector can dose the reductant into the interior of the inner housing. The wire mesh includes a plurality of openings. The openings can receive at least a portion of the exhaust gas within the outer housing and downstream of the injector. The outlet of the inner housing can discharge a mixture of the exhaust gas and the reductant.

In another aspect of the subject disclosure, a mixer assembly for mixing an injected reductant with an exhaust gas output from a combustion engine includes an outer housing, a tubular inner housing, and an injector. The outer housing includes a wall defining an exhaust gas passageway. The exhaust gas passageway can receive exhaust gas from the engine. The tubular inner housing is at least partially disposed within the outer housing. The inner housing includes a longitudinal axis, a first end, and outlet, a first peripheral wall, and a second peripheral wall. The outlet is disposed at a second end of the inner housing opposite the first end of the inner housing. The first peripheral wall is at least partially formed by wire mesh. The first peripheral wall or the wire mesh includes a first plurality of openings. The second peripheral wall includes a second plurality of openings. The first peripheral wall is disposed inside the second peripheral wall. The injector is fixed to one of the inner housing or the outer housing. The injector can dose the reductant into an interior of the inner housing. The first and second pluralities of openings can receive at least a portion of the exhaust gas within the outer housing and downstream of the injector. The outlet of the inner housing can discharge a mixture of the exhaust gas and the reductant.

In yet another aspect of the subject disclosure, a mixer assembly for mixing an injected reductant with an exhaust gas output from a combustion engine includes an outer housing, a tubular inner housing, and an injector. The outer housing includes an outer wall defining an exhaust gas passageway that can receive exhaust gas from the engine. The tubular inner housing is at least partially disposed within the outer housing. The inner housing includes a longitudinal axis, a first end, an outlet, a first portion, and a second portion. The outlet disposed is at a second end of the inner housing opposite the first end of the inner housing. The first portion is disposed adjacent to the first end. The second portion is disposed between the first portion and the second end At least one of the first portion and the second portion is at least partially formed by wire mesh. The injector is fixed to one of the inner housing and the outer housing. The injector can dose the reductant into an interior of the inner housing. The second portion includes a plurality of openings that can receive at least a portion of the exhaust gas within the outer housing and downstream of the injector. The outlet of the inner housing can discharge a mixture of the exhaust gas and the reductant.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic representation of an exhaust aftertreatment system having a mixer assembly according to the principles of the present disclosure;

FIG. 2 is a schematic representation of the mixer assembly of FIG. 1, including an exhaust gas passageway, a mixer, and a reductant injector;

FIG. 3 is a perspective view of the mixer of FIG. 2;

FIG. 4 is another mixer according to the principles of the present disclosure;

FIG. 5 is a cross-sectional view of the mixer of FIG. 4 taken at line 5-5 of FIG. 4;

FIG. 6 is a perspective view of another mixer according to the principles of the present disclosure;

FIG. 7 is a perspective view of another mixer according to the principles of the present disclosure;

FIG. 8 is a perspective view of another mixer according to the principles of the present disclosure;

FIG. 9 is a perspective view of another mixer according to the principles of the present disclosure;

FIG. 10 is a perspective view of another mixer according to the principles of the present disclosure;

FIG. 11 is a perspective view of another mixer according to the principles of the present disclosure;

FIG. 12 is a perspective view of another mixer according to the principles of the present disclosure;

FIG. 13 is a perspective view of another mixer according to the principles of the present disclosure;

FIG. 14 is a perspective view of another mixer according to the principles of the present disclosure;

FIG. 19 is a perspective view of another mixer according to the principles of the present disclosure;

FIG. 20 is a perspective view of another mixer according to the principles of the present disclosure;

FIG. 21 is a cross-sectional view of the mixer of FIG. 20 taken at line 21-21 of FIG. 20;

Corresponding reference numerals indicate corresponding parts throughout the several views of the drawings.

DETAILED DESCRIPTION

Figure 15:
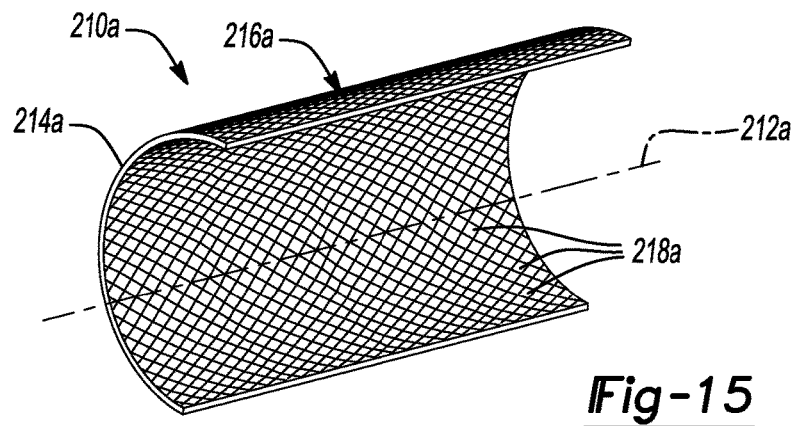
FIG. 15 is a perspective view of another mixer according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, an exhaust aftertreatment system 10 is provided that may treat exhaust gas output by a combustion engine 12. The exhaust aftertreatment system 10 may include an exhaust gas passageway 14, an oxidation catalyst (e.g., a diesel oxidation catalyst or DOC) 16, a filter (e.g., a diesel particulate filter (DPF)) 18, a mixer assembly 20 and a selective catalytic reduction (SCR) catalyst 22. The DOC 16, filter 18, mixer assembly 20 and SCR catalyst 22 are disposed within the exhaust gas passageway 14 such that some or all of the exhaust gas output from engine 12 flows therethrough.

A hydrocarbon (HC) injector 24 may be disposed in or adjacent to the exhaust gas passageway 14 at a location upstream of the DOC 16. The HC injector 24 may receive hydrocarbon fuel from a fuel source 26 and may inject the fuel into the stream of exhaust gas upstream of the DOC 16. A burner (not shown) may be disposed at least partially within the exhaust gas passageway 14 upstream of the DOC 16 at or adjacent the HC injector 24. The burner may ignite the fuel injected by the HC injector 24 to regenerate the DOC 16 and/or the filter 18.

A reductant injector 28 may be disposed adjacent to or partially within the mixer assembly 20 upstream of the SCR catalyst 22. The reductant injector 28 may receive a reductant (e.g., urea or gaseous ammonia) from a reductant tank 30 and inject the reductant into an exhaust stream upstream of or in the mixer assembly 20. The reductant may mix with exhaust gas within the mixer assembly 20 prior to flowing through the SCR catalyst 22.

As discussed above, the geometry of known mixer assemblies which include sharp edges having a surface roughness, can lead to the undesirable formation of wall film. A mixer assembly according to the principles of the present disclosure includes a wall at least partially formed by wire mesh. A wire of the wire mesh has a circular cross-sectional shape that does not include sharp edges or surface roughness, which may promote wall film formation. Thus, the geometry of the mixer assembly leads to a reduced formation of urea deposits when compared to other mixers.

The mixer assembly 20 is depicted in greater detail in FIGS. 2 and 3. The mixer assembly 20 may include an outer housing 32 having an outer wall 34 defining the exhaust gas passageway 14. The outer wall 34 may include a first portion 36 and a second portion 38. The first portion 36 may extend along a first longitudinal axis A1 and the second portion 38 may extend along a second longitudinal axis A2. While the outer wall 34 is shown as having a ninety-degree bend, it will be appreciated that the outer wall 34 could have a bend of less than or greater than ninety degrees and could have any suitable configuration.

The mixer assembly 20 may include a mixing tube or inner housing 40. The inner housing 40 may be generally tubular and may extend along a third longitudinal axis A3. The inner housing 40 may be disposed at least partially within the outer housing 32. The inner housing 40 may be directed or indirectly connected to the outer housing 32. Although the inner housing 40 is shown as cantilevered with respect to the outer housing 32, it may supported by the outer housing 32 in alternative arrangements. The outer housing 32 may include an opening 42 through with the inner housing 32 may extend. The third longitudinal axis A3 of the inner housing 40 may be aligned with the second longitudinal axis A2 of the second portion 38 of the outer wall 34 such that the inner housing 40 and the second portion 38 of the outer wall 34 are coaxial. In some configurations, the inner housing may be disposed so that the third longitudinal axis A3 of the inner housing 40 is substantially transverse to the second longitudinal axis A2 of the outer housing 32.

The inner housing 40 may include a peripheral wall 44 extending between a first end 46 and a second end 48 opposite the first end 46. The peripheral wall 44 may define an interior 50 of the inner housing 40. At least a portion of the peripheral wall 44 may be formed by wire mesh 52. A non-mesh portion 53 may be formed by any suitable material, such as steel, aluminum, or titanium. The wire mesh 52 includes wires having circular cross-sectional shapes. The circular cross-sectional shapes of the wire mesh 52 are free from sharp edges or surface roughness that may promote wall film formation.

The wire mesh 52 may be coated with a low-coefficient of friction material to discourage the formation of urea deposits. The low-coefficient of friction material may be able to perform under severe operating conditions, including a corrosive and high temperature environment, without degrading. In one example, the low-coefficient of friction material comprises a non-stick material. One example of a non-stick material is Teflon®, for example; however, other low-coefficient of friction materials could also be used.

The inner housing 40 may include an end wall or end cap 54 (FIG. 2) disposed at the first end 46 such that the first end 46 of the inner housing 40 is enclosed. Those skilled in the art would appreciate that the inner housing 40 may be rotated so that the end cap 54 is alternatively disposed at the second end 48 (not shown). The end wall 54 may engage the peripheral wall 44. The reductant injector 28 may extend through an opening 56 in the end wall 54. The reductant injector 28 may be fixed to one of the outer housing 32 and the inner housing 40 and may be coaxial with the third longitudinal axis A3 of the inner housing 40. The reductant injector 28 may dose reductant 57 into the interior 50 of the inner housing 40 to be mixed with exhaust gas. The reductant 57 may be dispersed as a spray cone that expands axially and radially, and can hit an inner surface of the peripheral wall 44.

Exhaust gas upstream of the inner housing 40 is indicated by arrows 58. At least a portion of the exhaust gas, as shown at arrows 60, may enter the interior 50 of the inner housing 40 through a plurality of openings 62 in the wire mesh 52. Exhaust gas upstream of the reductant injector 28 flows through the openings 62 in the wire mesh and mixes with reductant in the interior 50 of the inner housing 40. A mixture of exhaust gas and reductant exits the inner housing 40 through an outlet 64 disposed at the second end 48, as shown by arrows 66.

A first dimension 68 of the second portion 38 of the outer wall 34 may be greater than a second dimension 70 of the inner housing 40. Thus, another portion of the exhaust gas, as shown by arrows 72 may flow around the inner housing 40, bypassing the interior 50 of the inner housing 40. Although the first dimension 68 of the second portion 38 of the outer wall 34 is shown as greater than the second dimension 70 of the inner housing 40, it will be appreciated that the first and second dimensions 68, 70 may be the same so that all the exhaust gas flows through the interior 50 of the inner housing 40.

In some configurations, the inner housing 40 includes additional features. For example, the peripheral wall may include a plurality of openings or perforations (see, e.g., FIGS. 25, 27) distinct from the wire mesh openings. It should be understood that the openings can have other geometries and may include different shapes or sizes or may be present at different densities (i.e., ratio of blocked area compared to total area). In another example, the inner housing may include both a plurality of openings distinct from the wire mesh openings and a respective plurality of deflectors that extend radially-inward from the peripheral wall (see e.g., FIG. 24). In yet another example, the inner housing may include both a plurality of openings distinct from the wire mesh openings and a respective plurality of blades or louvers (see, e.g., FIG. 26). In other examples, the inner housing may have an additional component disposed adjacent to the peripheral wall, such as a swirler (see, e.g., FIG. 24) or a flow reversing device (see, e.g., FIG. 27). It should be appreciated that the above examples are non-limiting and any of the above features, a combination of the above features, or other features, may be present on any of the peripheral walls inner housings discussed herein.

With reference to FIGS. 4 and 5, an inner housing 110 having first and second peripheral walls 112, 114 is provided. The inner housing 110 is generally tubular and extends along a longitudinal axis 116. The first peripheral wall 112 is disposed inside the second peripheral wall 114. The first peripheral wall 112 may be spaced apart from the second peripheral wall 114 such that a gap 118 is present between the first and second peripheral walls 112, 114. In other configurations (not shown), an outer surface of the first peripheral wall 112 may engage an inner surface of the second peripheral wall 114 such that the gap 118 is substantially eliminated. The first and second peripheral walls 112, 114 may extend between first and second ends 120, 122 of the inner housing. The first end 120 of the inner housing 110 may include an end wall or cap (not shown), through which a reductant injector (not shown) extends.

The first peripheral wall 112 may be formed by wire mesh 124 having a first plurality of openings 126. The second peripheral wall 114 may be formed by a non-wire mesh material 128, such as steel, aluminum, titanium, or any other suitable material known to one skilled in the art. The second peripheral wall 114 may include a second plurality of openings 130. It should be appreciated that the inner housing 110 may include one or more alternative or additional features as discussed above, such as deflectors or blades on the second peripheral wall 114, and a swirler or flow reversing device adjacent to the first and second peripheral walls 112, 114, as non-limiting examples.

The inner housing 110 receives exhaust gas after the exhaust gas flows through the second plurality of openings 130 in the second peripheral wall 114 and the first plurality of openings 126 in the first peripheral wall 112. The exhaust gas is mixed with reductant in an interior 132 of the inner housing 110 and exits through an outlet 134 at the second end 122. While the first and second peripheral walls 112, 114 are shown as formed of entirely wire mesh and non-wire mesh, respectively, it should be appreciated that other constructions are contemplated within the present disclosure. For example, one or both of the first and second peripheral walls 112, 114 may include both mesh portions and non-mesh portions.

Additional examples of inner housings including both wire mesh and non-wire mesh portions are provided in FIGS. 6-12. Referring to FIG. 6, an inner housing 150 is provided. The inner housing 150 may be generally tubular and may include a longitudinal axis 152. The inner housing 150 may include a peripheral wall 154 that extends between a first end 156 and a second end 158.

The peripheral wall 154 may include a mesh section 160 and a non-mesh section 162. The mesh section 160 and the non-mesh sections 162 may be circumferentially spaced about the longitudinal axis 152. The mesh section 160 and the non-mesh section 162 may both be shaped as semi-cylinders. Thus, each section may span an angle of about 180° about the longitudinal axis 152. Both the mesh and non-mesh sections 160, 162 extend along an entire length of the peripheral wall 154 in the direction of the longitudinal axis 152.

The mesh section 160 is formed from mesh having a first plurality of openings 164. The non-mesh section 162 is formed from any suitable material such as steel, aluminum, or titanium. The non-mesh section 162 includes a second plurality of openings 166. It should be appreciated that the inner housing 150 may include one or more alternative or additional features as discussed above, such as deflectors or blades on the peripheral wall 154, and a swirler or flow reversing device adjacent to the peripheral wall 154, as non-limiting examples.

Referring to FIG. 7, another inner housing 150*a* is provided. The inner housing includes a longitudinal axis 152*a*, a peripheral wall 154*a*, a first end 156*a*, and a second end 158*a*, similar to the longitudinal axis 152, peripheral wall 154, first end 156, and second end 158 of FIG. 6. Accordingly, the longitudinal axis 152*a*, peripheral wall 154*a*, and first and second ends 156*a*, 158*a* will not be described in detail.

The peripheral wall 154*a* may include mesh sections 160*a* and non-mesh sections 162*a*. The mesh sections 160*a* and the non-mesh sections 162*a* may be circumferentially spaced about the longitudinal axis 152*a*. The mesh sections 160*a* and the non-mesh sections 162*a* may both be shaped as partial-cylinders. Where the peripheral wall 154*a* includes two mesh sections 160*a* and two non-mesh sections 162*a* and each of the sections is substantially the same size, each section may span an angle of about 90° about the longitudinal axis 152*a*. Each of the mesh and non-mesh sections 160*a*, 162*a* may extend along an entire length of the peripheral wall 154*a* in the direction of the longitudinal axis 152*a*. While the inner housing 150*a* includes four equally sized mesh and non-mesh sections 160*a*, 162*a*, it should be appreciated that mesh and non-mesh sections 160*a*, 162*a* could be present in quantities greater than or less than four, and in non-equal angles.

The mesh and non-mesh sections 160*a*, 162*a* have a first and second plurality of openings 164*a*, 166*a*. Aside from shape and size, the mesh and non-mesh sections 160*a*, 162*a* are similar to the mesh and non-mesh sections 160, 162 of FIG. 6. Thus, they will not be described in great detail.

Referring to FIG. 8, another inner housing 150*b* is provided. The inner housing 150*b* may include a longitudinal axis 152*b*, a peripheral wall 154*b*, and first and second ends 156*b*, 158*b*, similar to the longitudinal axis 152, peripheral wall 154, and first and second ends 156, 158 of FIG. 6. Accordingly, the longitudinal axis 152*b*, peripheral wall 154*b*, and first and second ends 156*b*, 158*b* will not be described in detail. An end cap for supporting an injector may be disposed at either of the first end 156*b* or the second end 156*b* (not shown).

The peripheral wall 154*b* may include a mesh section 160*b* and a non-mesh section 162*b*. The mesh section 160*b* and the non-mesh section 162*b* may be axially spaced along the longitudinal axis 152*b*. The mesh section 160*b* and the non-mesh section 162*b* may both be shaped as cylinders and may be disposed adjacent to one another along the longitudinal axis 152*b*. Each of the mesh and non-mesh sections 160*b*, 162*b* may extend along a portion of the entire length of the peripheral wall 154*b* in the direction of the longitudinal axis 152*b*. While two equally sized mesh and non-mesh sections 160*b*, 162*b* are shown, it should be appreciated that mesh and non-mesh sections 160*b*, 162*b* could be present in quantities greater than or less than two, and in non-equal lengths.

The mesh and non-mesh sections 160*b*, 162*b* have a first and second plurality of openings 164*b*, 166*b*. Aside from shape and size, the mesh and non-mesh sections 160*b*, 162*b* are similar to the mesh and non-mesh sections 160, 162 of FIG. 6. Thus, they will not be described in great detail.

With reference to FIG. 9, another inner housing 150c is provided. The inner housing 150c may include a longitudinal axis 152c, a peripheral wall 154c, and first and second ends 156c, 158c, similar to the longitudinal axis 152, peripheral wall 154, and first and second ends 156, 158 of FIG. 6. Accordingly, the longitudinal axis 152c, peripheral wall 154c, and first and second ends 156c, 158c will not be described in detail.

The peripheral wall 154c may include two mesh sections 160c and one non-mesh section 162c. The mesh section 160c and the non-mesh sections 162c may be axially spaced along the longitudinal axis 152c. The mesh sections 160c and the non-mesh section 162c may both be shaped as cylinders and may be disposed adjacent to one another along the longitudinal axis 152c. Each of the mesh and non-mesh sections 160c, 162c extends along a portion of the entire length of the peripheral wall 154c in the direction of the longitudinal axis 152c. The mesh and non-mesh sections 160c, 162c have a first and second plurality of openings 164c, 166c. Aside from shape and size, the mesh and non-mesh sections 160c, 162c are similar to the mesh and non-mesh sections 160, 162 of FIG. 6. Thus, they will not be described in great detail.

Referring to FIG. 10, another inner housing 150d is provided. The inner housing 150d may include a longitudinal axis 152d, a peripheral wall 154d, and first and second ends 156d, 158d, similar to the longitudinal axis 152, peripheral wall 154, and first and second ends 156, 158 of FIG. 6. Accordingly, the longitudinal axis 152d, peripheral wall 154d, and first and second ends 156d, 158d will not be described in detail.

The peripheral wall 154d may include three mesh sections or windows 160d, surrounded by a non-mesh section 162d. The mesh and non-mesh sections 160d, 162d have a first and second plurality of openings 164d, 166d. Aside from shape and size, which are discussed in greater detail below, the mesh and non-mesh sections 160d, 162d are similar to the mesh and non-mesh sections 160, 162 of FIG. 6. Thus, they will not be described in great detail.

The peripheral wall 154d has a circumference 180d a first length 182d in an axial direction parallel to the longitudinal axis 152d. Each mesh window 160d has a second length 184d the axial direction. The second length 184d is less than the first length 182d. Each mesh window 160d has an arc length 186d along in a circumferential direction with respect to the longitudinal axis 152d. The arc length 186d is less than the circumference 180d. Although the peripheral wall 154d includes three mesh windows 160d of substantially equal size and shape disposed in a line, it should be understood that the mesh windows 160d may be present in other quantities, shapes, sizes, and orientations. In some configurations, the location of the wire mesh and non-wire mesh materials may be reversed so that the peripheral wall includes non-wire mesh windows surrounded by wire mesh.

With reference to FIG. 11, another inner housing 150e is provided. The inner housing 150e may include a longitudinal axis 152e, a peripheral wall 154e, and first and second ends 156e, 158e, similar to the longitudinal axis 152, peripheral wall 154, and first and second ends 156, 158 of FIG. 6. Accordingly, the longitudinal axis 152e, peripheral wall 154e, and first and second ends 156e, 158e will not be described in detail.

The peripheral wall 154e may include one wire mesh section or window 160e, surrounded by a non-mesh section 162e. The mesh and non-mesh sections 160e, 162e have a first and second plurality of openings 164e, 166e, respectively. Aside from shape and size, which are discussed in greater detail below, the mesh and non-mesh sections 160e, 162e are similar to the mesh and non-mesh sections 160, 162 of FIG. 6. Thus, they will not be described in great detail.

The peripheral wall 154e has a circumference 180e a first length 182e in an axial direction parallel to the longitudinal axis 152e. The mesh window 160e has a second length 184e the axial direction. The second length 184e is less than the first length 182e. The mesh window 160e has an arc length 186e along in a circumferential direction with respect to the longitudinal axis 152e. The arc length 186e is less than the circumference 180e.

Referring to FIG. 12, another inner housing 150f is provided. The inner housing 150f may include a longitudinal axis 152f, a peripheral wall 154f, and first and second ends 156f, 158f, similar to the longitudinal axis 152, peripheral wall 154, and first and second ends 156, 158 of FIG. 6. Accordingly, the longitudinal axis 152f, peripheral wall 154f, and first and second ends 156f, 158f will not be described in detail. An end cap for supporting an injector may be disposed at either the first end 156f or the second end 158f (not shown).

The peripheral wall 154f may include a mesh section 160f and a non-mesh section 162f. The mesh section 160f and the non-mesh section 162f may be axially spaced along the longitudinal axis 152f. More specifically, the mesh section 160f may be disposed at the first end 156f of the peripheral wall 154f so that it would be near a reductant injector (not shown) when the inner housing 150f is installed in a mixer assembly. The mesh section 160f and the non-mesh section 162f may both be shaped as cylinders. The non-mesh section 162f may be disposed adjacent to the mesh section 160f at the second end 158f of the peripheral wall 154f.

The mesh and non-mesh sections 160f, 162f have a first and second plurality of openings 164f, 166f, respectively, similar to the first and second plurality of openings 164, 166 of FIG. 6. The mesh portion 160f may include a third plurality of openings or scavenging holes 190f that is distinct from the first plurality of openings 164f in the wire mesh section 160f. The scavenging holes 190f may have a first dimension 192f that is greater than a second dimension 194f of the openings of the first plurality 164f in the wire mesh section 160f. Aside from shape and size, the non-mesh section 162f is similar to the non-mesh section 162 of FIG. 6. Thus, it will not be described in great detail.

With reference to FIG. 13, another inner housing 150g is provided. The inner housing 150g may include a longitudinal axis 152g, a peripheral wall 154g, and first and second ends 156g, 158g, similar to the longitudinal axis 152, peripheral wall 154, and first and second ends 156, 158 of FIG. 6. Accordingly, the longitudinal axis 152g, peripheral wall 154g, and first and second ends 156g, 158g will not be described in detail.

The peripheral wall 154g may be entirely non-mesh 162g. A mesh helix 160g may be disposed along an inner surface of the peripheral wall 154 g. The mesh helix 160g has a first plurality of openings 164g. The non-mesh 162g has a second plurality of openings 166g. Aside from shape, size, and orientation, the mesh helix 160g and the non-mesh 162g are similar to the mesh and non-mesh sections 160, 162 of FIG. 6. Thus, they will not be described in great detail.

FIGS. 14-21 show examples of inner housings including one or more densities of wire mesh. With reference to FIG. 14, an inner housing 210 is provided. The inner housing 210 is generally tubular and extends along a longitudinal axis 212. The inner housing 210 includes a peripheral wall 214 formed entirely of wire mesh 216. When the inner housing 210 is included in a mixer assembly (not shown), at least a portion of the exhaust gas flows through a plurality of openings 218 in the wire mesh 216.

Referring to FIG. 15, an inner housing 210a is provided. The inner housing 210a extends along a longitudinal axis 212a. The inner housing 210a is a partial tube having an open section. For example, the inner housing 210a may have a semi-cylinder shape. The inner housing 210a may include a peripheral wall 214a formed entirely of wire mesh 216a. When the inner housing 210a is included in a mixer assembly (not shown), at least a portion of the exhaust gas flows through a plurality of openings 218a in the wire mesh 216a. By way of non-limiting example, the open section may be oriented toward a first portion of an outer housing (see FIG. 1).

Figure 16:
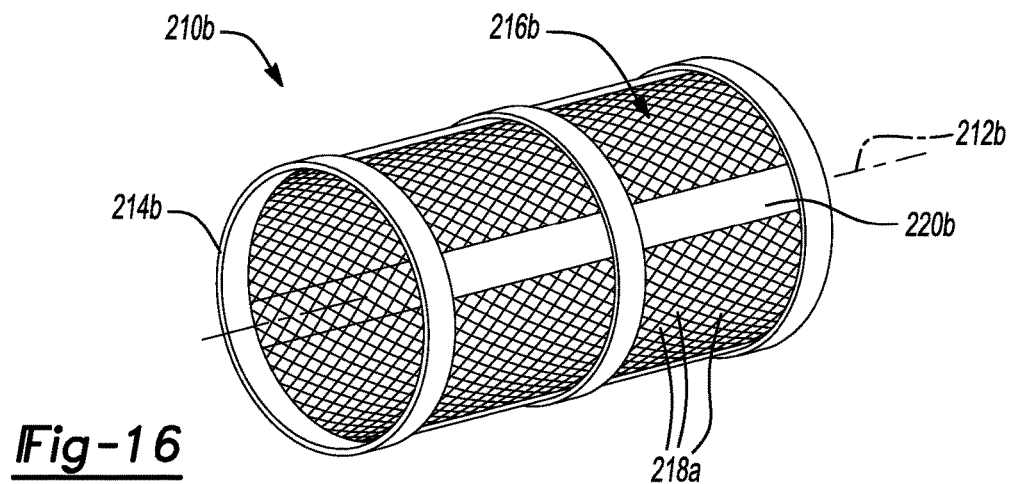
FIG. 16 is another mixer according to the principles of the present disclosure.

With reference to FIG. 16, an inner housing 210b is provided. The inner housing 210b may be generally tubular and extend along a longitudinal axis 212b. The inner housing 210b may include a peripheral wall 214b formed of wire mesh 216b having a plurality of openings 218b. The wire mesh 216b may be supported by a support cage 220b. The support cage 220b may comprise steel, by way of non-limiting example. When the inner housing 210b is included in a mixer assembly (not shown), at least a portion of the exhaust gas flows through a plurality of openings 218b in the wire mesh 216b.

Figure 17:
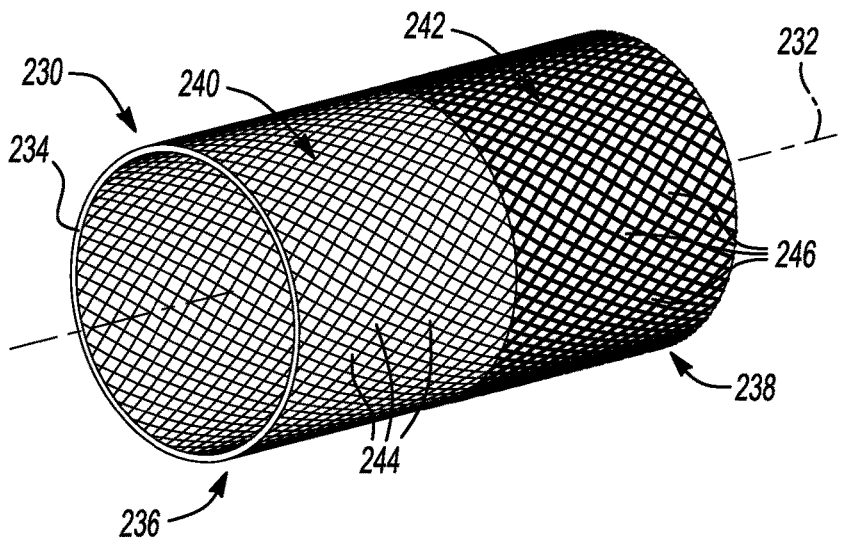
FIG. 17 is a perspective view of another mixer according to the principles of the present disclosure.

Referring to FIG. 17, another inner housing 230 is provided. The inner housing 230 is generally tubular and extends along a longitudinal axis 232. The inner housing 230 includes a peripheral wall 234 extending between a first end 236 and a second end 238.

The peripheral wall 234 may include a first density wire mesh section 240 and a second density wire mesh section 242. Densities of the first and second wire mesh sections 240, 242 may be distinct. As used herein, mesh density refers to the ratio of blocked area to total surface area. Thus, a mesh having a higher density has more blocked area and less open area than a mesh having a lower density.

The first density wire mesh section 240 and the second density wire mesh section 242 may be axially spaced along the longitudinal axis 232. The first and second density wire mesh sections 240, 242 may both be shaped as cylinders and may be disposed adjacent to one another along the longitudinal axis 232. Each of the first and second density wire mesh sections 240, 242 extends along a portion of the entire length of the peripheral wall 234 in the direction of the longitudinal axis 232. While two equally sized first and second density mesh sections 240, 242 are shown, it should be appreciated that the sections could be present in quantities greater than or less than two, and in non-equal lengths.

The first density wire mesh section 240 is formed from mesh having a first plurality of openings 244. The second density wire mesh section 242 is formed from wire mesh having a second plurality of openings 246. It should be appreciated that the inner housing 230 may include one or more alternative or additional features as discussed above, such as deflectors, blades, a swirler, and a flow reversing device, as non-limiting examples.

Figure 18:
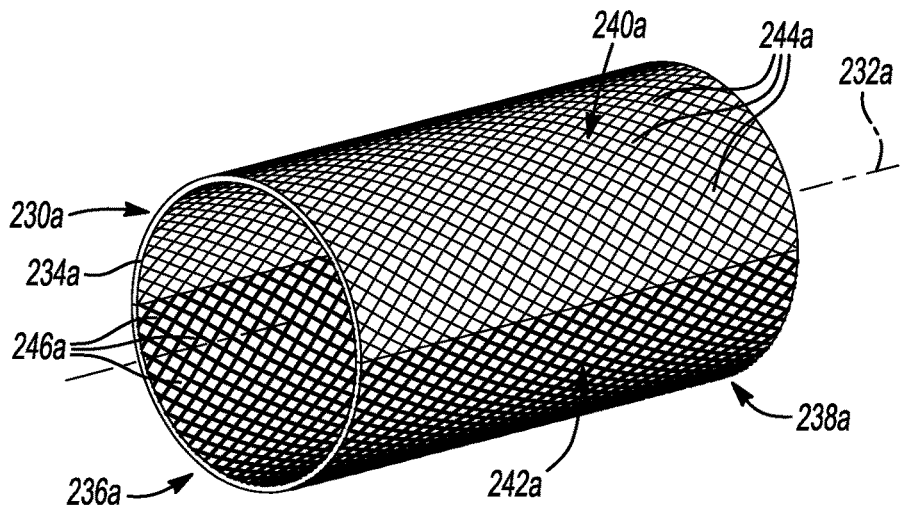
FIG. 18 is a perspective view of another mixer according to the principles of the present disclosure.

Referring now to FIG. 18, another inner housing 230a is provided. The inner housing 230a may include a longitudinal axis 232a, a peripheral wall 234a, and first and second ends 236a, 238a, similar to the longitudinal axis 232, peripheral wall 234, and first and second ends 236, 238 of FIG. 17. Accordingly, the longitudinal axis 232a, peripheral wall 234a, and first and second ends 236a, 238a will not be described in detail.

The peripheral wall 234a may include a first density wire mesh section 240a and a second density wire mesh section 242a. The first and second density wire mesh sections 240a, 242a may be circumferentially spaced about the longitudinal axis 232a. The first and second density wire mesh sections 240a, 242a may be shaped as semi-cylinders. Thus, each section may span an angle of about 180° about the longitudinal axis 232a. Both the first and second density wire mesh sections 240a, 242a extend along an entire length of the peripheral wall 234a in the direction of the longitudinal axis 232a.

The first and second density wire mesh sections 240a, 242a have a first and second plurality of openings 244a, 246a, respectively. Aside from shape and size, the first and second density wire mesh sections 240a, 242a are similar to the first and second density wire mesh sections 240, 242 of FIG. 17. Thus, they will not be described in great detail.

Referring now to FIG. 19, another inner housing 230b is provided. The inner housing 230b may include a longitudinal axis 232b, a peripheral wall 234b, and first and second ends 236b, 238b, similar to the longitudinal axis 232, peripheral wall 234, and first and second ends 236, 238 of FIG. 17. Accordingly, the longitudinal axis 232b, peripheral wall 234b, and first and second ends 236b, 238b will not be described in detail.

The peripheral wall 234b may include a first density mesh section 240b and a second density mesh section 242b. The first and second density mesh sections 240b, 242b may be circumferentially spaced about the longitudinal axis 232b. The first density mesh section 240b and the second density mesh section 242b may both be shaped as partial-cylinders. Where the peripheral wall 234b includes two first density mesh sections 240b and two second density mesh sections 242b, each of the sections because substantially the same size, each section may span an angle of about 90° about the longitudinal axis 232b. Each of the first and second density mesh sections 240b, 242b extends along an entire length of the peripheral wall 234b in the direction of the longitudinal axis 232b. While four equally sized mesh and non-mesh sections 240b, 242b are shown, it should be appreciated that mesh and non-mesh sections 240b, 242b could be present in quantities greater than or less than four, and in non-equal angles.

The first and second density wire mesh sections 240b, 242b have a first and second plurality of openings 244b, 246b. Aside from shape and size, the first and second density wire mesh sections 240b, 242b are similar to the first and second density wire mesh sections 240, 242 of FIG. 17. Thus, they will not be described in great detail.

With reference to FIGS. 20 and 21, an inner housing 260 having first and second peripheral walls 262, 264 is provided. The inner housing 260 is generally tubular and extends along a longitudinal axis 266. The first peripheral wall 262 is disposed inside the second peripheral wall 264. The first peripheral wall 262 may be spaced apart from the second peripheral wall 264 such that a gap 268 is present between the first and second peripheral walls 262, 264. In other configurations (not shown), an outer surface of the first peripheral wall 262 may engage an inner surface of the second peripheral wall 264 such that the gap 268 is substantially eliminated. The first and second peripheral walls 262, 264 may extend between first and second ends 270, 272 of the inner housing 260. The first end 270 of the inner housing 260 may include an inner wall or end cap (not shown), through which a reductant injector (not shown) extends.

The first peripheral wall 262 may be formed by a first density wire mesh 274 having a first plurality of openings 276. The second peripheral wall 264 may be formed by a second density wire mesh 278 having a second plurality of openings 280. It should be appreciated that the inner housing 260 may include one or more alternative or additional features as discussed above, such as deflectors, blades, a swirler, and a flow reversing device, non-limiting examples.

Figure 22:
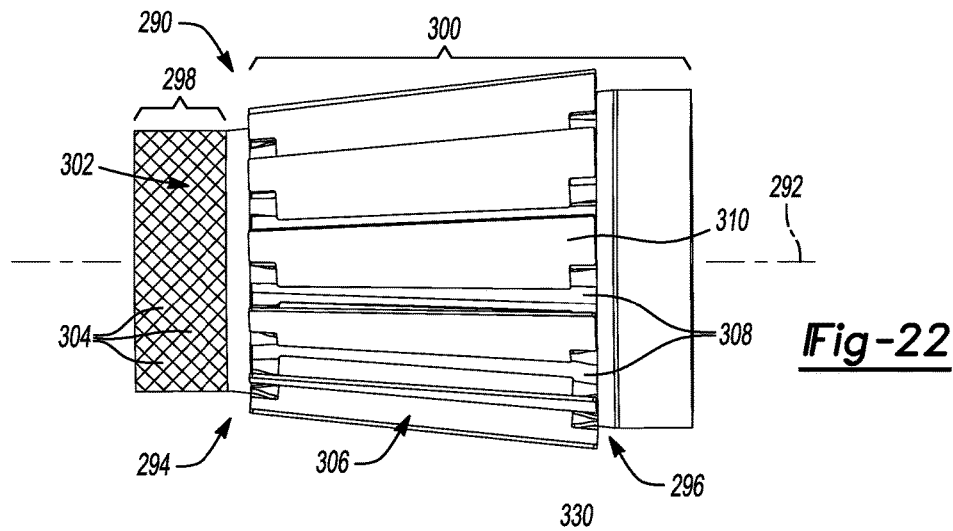
FIG. 22 is a perspective view of another mixer according to the principles of the present disclosure.

FIGS. 22-26 show examples of inner housings having two sections. Referring to FIG. 22, an inner housing 290 is provided. The inner housing 290 may be generally tubular and may extend along a longitudinal axis 292 between a first end 294 and a second end 296. The first end 294 of the inner housing 290 may include an end wall or cap (not shown).

The inner housing 290 includes a first portion 298 disposed adjacent to the first end 294 and a second portion 300 disposed between the first portion 298 and the second end 296. The first portion 298 may be cylindrical and the second portion 300 may be frusto-conical. The first portion 298 is formed from wire mesh 302 and includes a first plurality of openings 304 defined by the wire mesh 302. The second portion 300 is formed from a non-wire mesh material 306, such as steel, aluminum, or titanium. The second portion 300 includes a second plurality of openings 308. The second portion 300 also includes a plurality of louvers 310, each louver 310 being associated with a respective opening of the second plurality 308.

Figure 23:
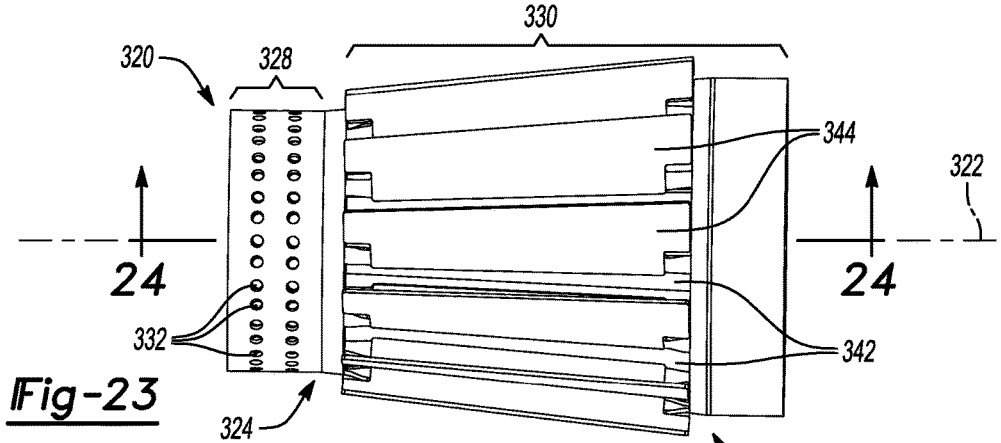
FIG. 23 is a perspective view of another mixer according to the principles of the present disclosure.
Figure 24:
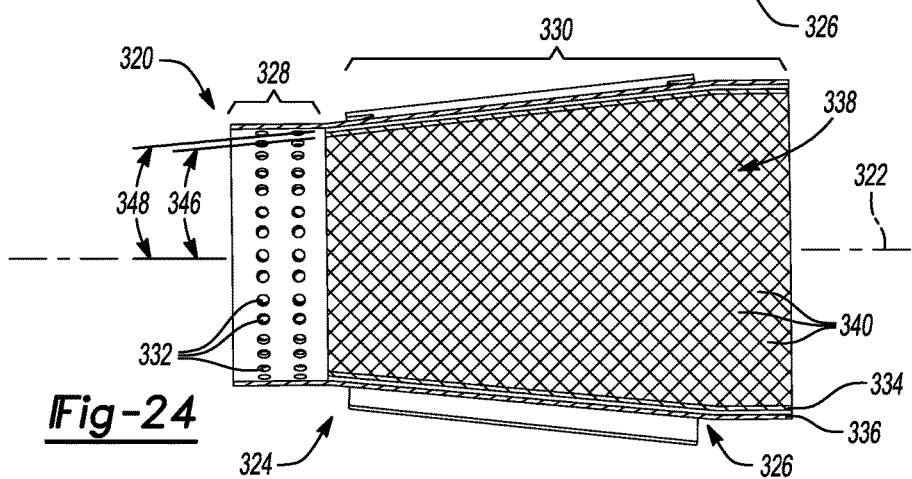
FIG. 24 is a cross-sectional view of the mixer of FIG. 23 taken at line 24-24 of FIG. 23.

With reference to FIGS. 23 and 24, another inner housing 320 is provided. The inner housing 320 includes a longitudinal axis 322 and extends between first and second ends 324, 326. The inner housing 320 includes first and second portions 328, 330. The first portion 328 is formed from a non-wire mesh material such as steel, aluminum, or titanium. The first portion 328 includes a first plurality of openings or scavenging holes 332.

The second portion 328 includes first and second peripheral walls 334, 336. The first peripheral wall 334 is disposed inside the second peripheral wall 336. The first peripheral wall 334 is formed from wire mesh 338 and includes a second plurality of openings 340. The second peripheral wall is formed from a non-wire mesh material 340, such as steel, aluminum, or titanium. The second peripheral wall 336 includes a third plurality of openings 342 and a respective plurality of louvers 344.

The first peripheral wall 334 may be disposed at a first angle 346 with respect to the longitudinal axis 322 and the second peripheral wall 336 may be disposed at a second angle 348 with respect to the longitudinal axis 322. The first and second angles 346, 348 may be substantially the same.

Figure 25:
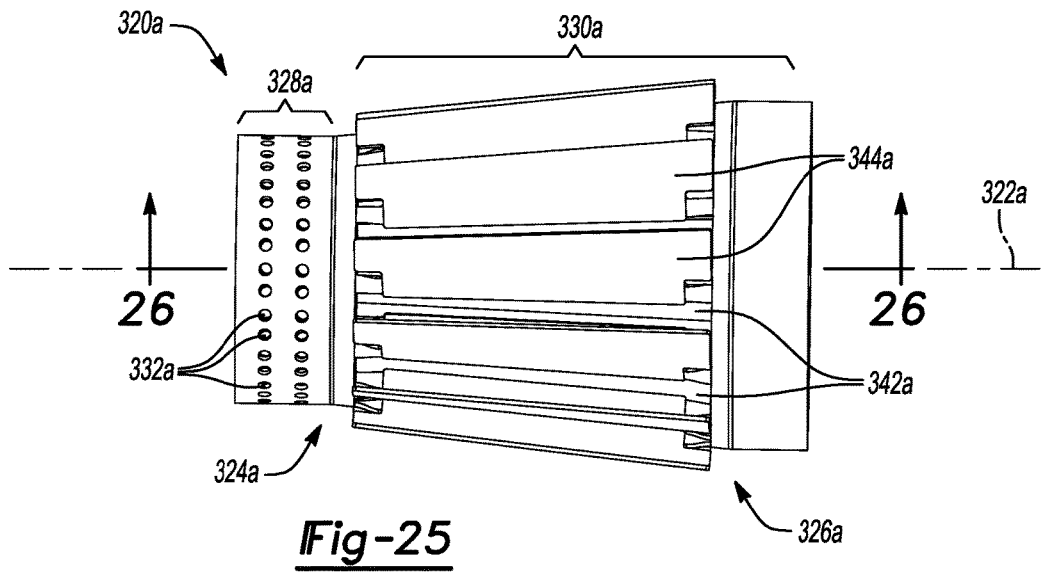
FIG. 25 is a perspective view of another mixer according to the principles of the present disclosure.
Figure 26:
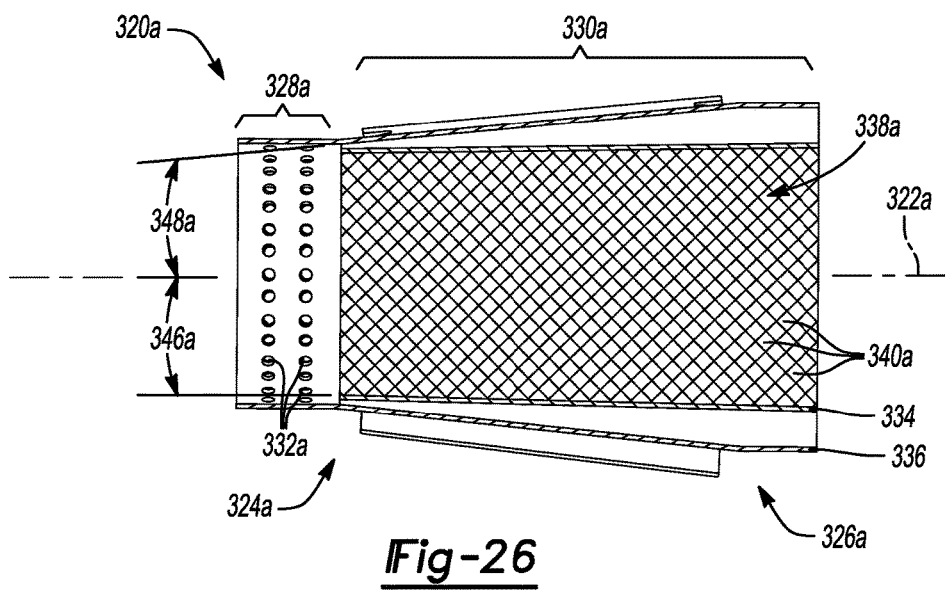
FIG. 26 is a cross-sectional view of the mixer of FIG. 25 taken at line 24-24 of FIG. 25.

Referring to FIGS. 25 and 26, another inner housing 320a is provided. The inner housing 320a includes a longitudinal axis 322a, a first end 324a, a second end 326a, and a first portion 328a similar to the longitudinal axis 322, first end 324, second end 326, and first portion 328 of FIGS. 23 and 24. The housing 320a includes a second portion 330a having first and second peripheral walls 334a, 336a. The first peripheral wall 334a may be disposed inside of the second peripheral wall 336a. The first peripheral wall 334a may be disposed at a first angle 346a with respect to the longitudinal axis 322a and the second peripheral wall 336a may be disposed at a second angle 348a with respect to the longitudinal axis 322a. The first and second angles 346a, 348a may be distinct. For example, the first angle 346a may be less than the second angle 348a.

Figure 27:
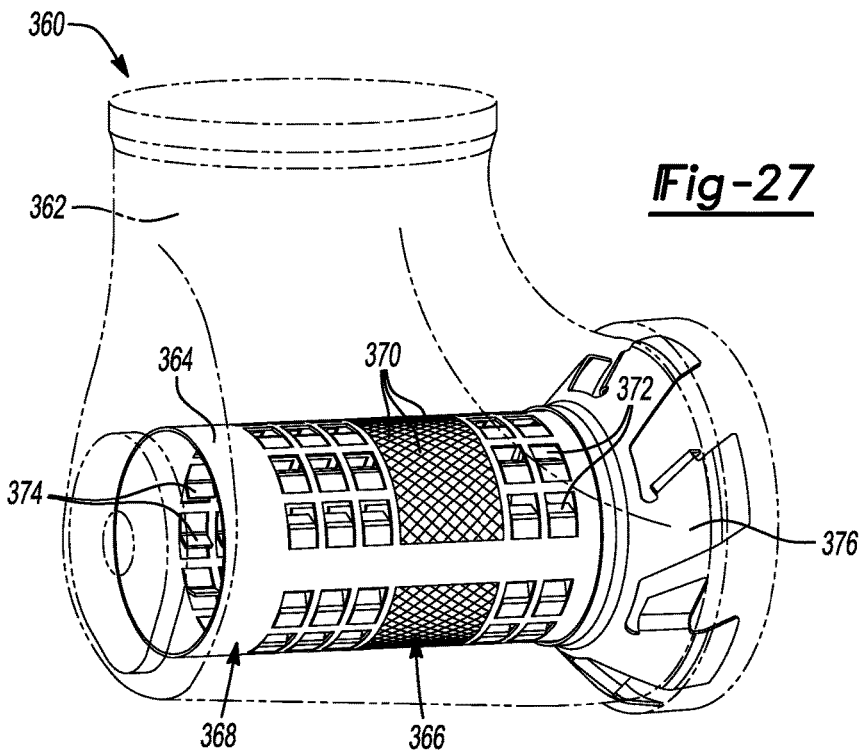
FIG. 27 is a perspective view of another mixer assembly according to the principles of the present disclosure.

FIGS. 27-33 show additional examples of inner housings and mixer assemblies having inner housings. Referring to FIG. 27, a mixer assembly 360 is provided. The mixer assembly 360 includes an outer housing 362, an inner housing 364. The inner housing 364 includes a mesh portion 366 and a non-mesh portion 368. The mesh portion 366 includes a first plurality of openings 370 and the non-mesh portion 368 includes a second plurality of openings 372. The non-mesh portion 368 also includes a plurality of deflectors 374, each deflector 374 being associated with a respective opening 372 of the second plurality. The deflectors 374 extend radially-inward toward an interior of the inner housing 364. The inner housing also includes a swirling mechanism 376.

Figure 28:
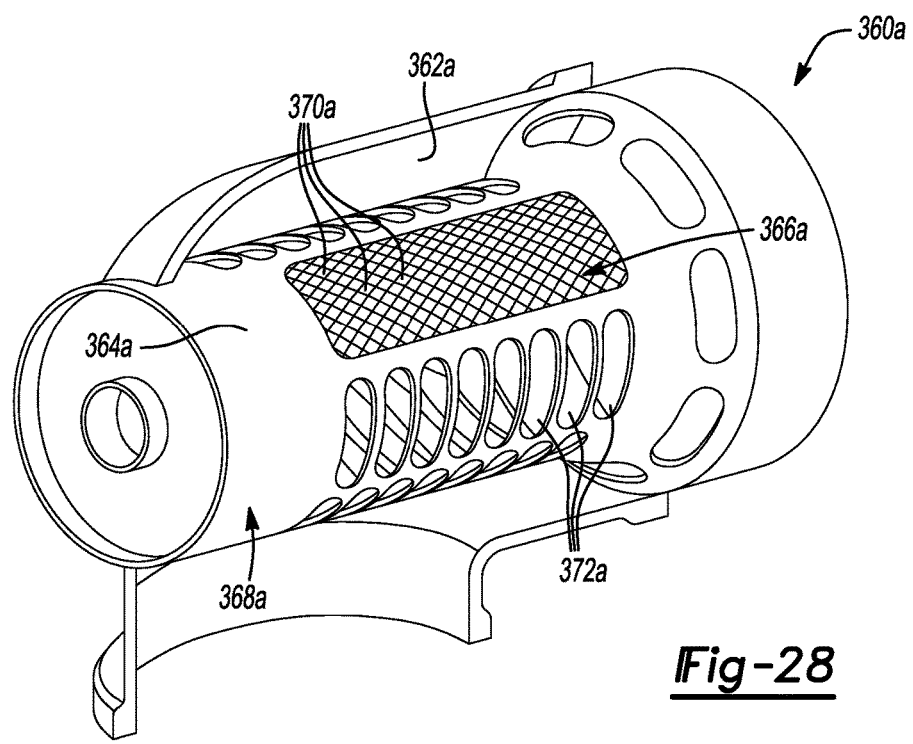
FIG. 28 is a perspective view of another mixer assembly according to the principles of the present disclosure.

With reference to FIG. 28, another mixer assembly 360a is provided. The mixer assembly 360a includes an outer housing 362a, an inner housing 364a. The inner housing 364a includes a mesh portion 366a and a non-mesh portion 368a. The mesh portion 366a includes a first plurality of openings 370a and the non-mesh portion 368a includes a second plurality of openings 372a.

Figure 29:
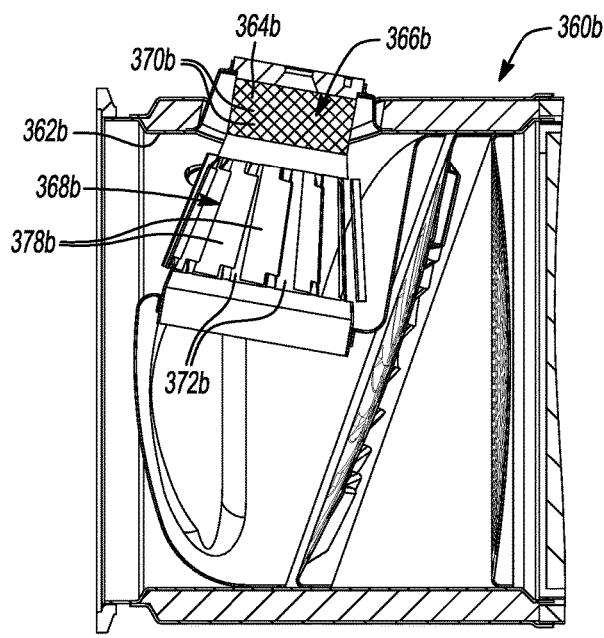
FIG. 29 is a perspective view of another mixer assembly according to the principles of the present disclosure.

Referring now to FIG. 29, a mixer assembly 360b is provided. The mixer assembly 360b includes an outer housing 362b, an inner housing 364b. The inner housing 364b includes a mesh portion 366b and a non-mesh portion 368b. The mesh portion 366b includes a first plurality of openings 370b and the non-mesh portion 368b includes a second plurality of openings 372b. The non-mesh portion 368b also includes a plurality of louvers 378b, each louver 378b being associated with a respective opening 372b of the second plurality. The louvers 378b extend radially-outward. A downstream frustoconical portion includes a third plurality of openings for bypass flow. In other embodiments (not shown), the third plurality of openings may include wire mesh.

Figure 30:
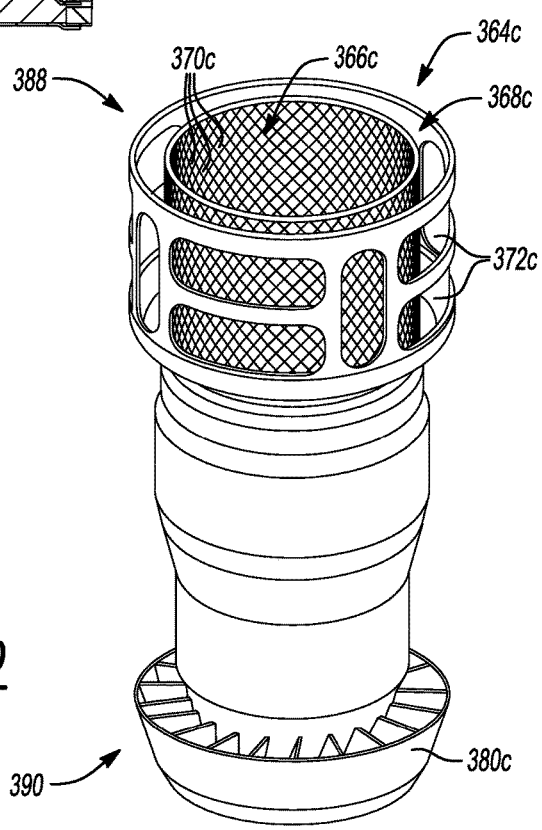
FIG. 30 is a perspective view of another mixer according to the principles of the present disclosure.

With reference to FIG. 30, an inner housing 364c for another mixer assembly is provided. The inner housing 364c includes a mesh portion 366c and a non-mesh portion 368c. The mesh portion 366c includes a first plurality of openings 370c and the non-mesh portion 368c includes a second plurality of openings 372c. The inner housing 364c also includes a flow reversing mechanism 380c. The inner housing 364c includes a first end 388 and a second end 390. An injector (not shown) may be disposed at the first end 388 and the flow reversing device 380 may be disposed at the second end 390.

Figure 31:
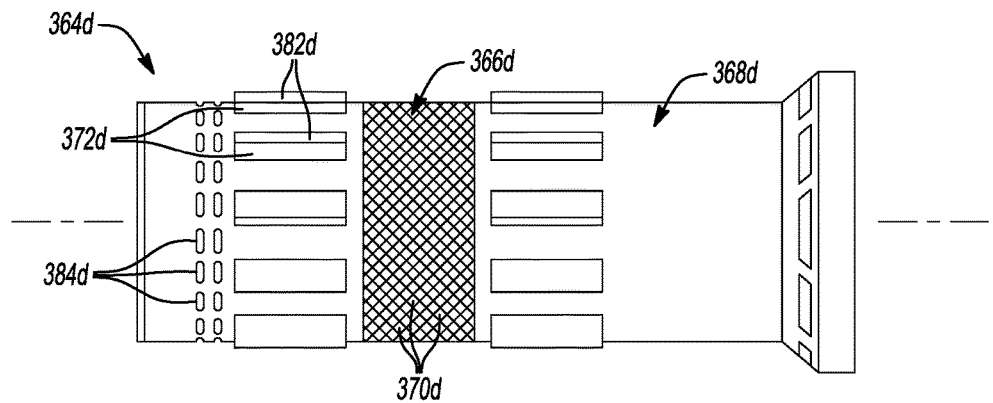
FIG. 31 is a side view of another mixer according to the principles of the present disclosure.

Referring now to FIG. 31, an inner housing 364d for another mixer assembly is provided. The inner housing 364d includes a mesh portion 366d and a non-mesh portion 368d. The mesh portion 366d includes a first plurality of openings 370d and the non-mesh portion 368d includes a second plurality of openings 372d. The non-mesh portion 368d also includes a plurality of blades 382d, each blade 382d being associated with a respective opening 372d of the second plurality. The blades 382d extend radially-outward. The non-mesh portion 368d also includes a third plurality of openings or scavenging holes 384d. The second and third pluralities of openings 372d, 384d have distinct shapes.

Figure 32:
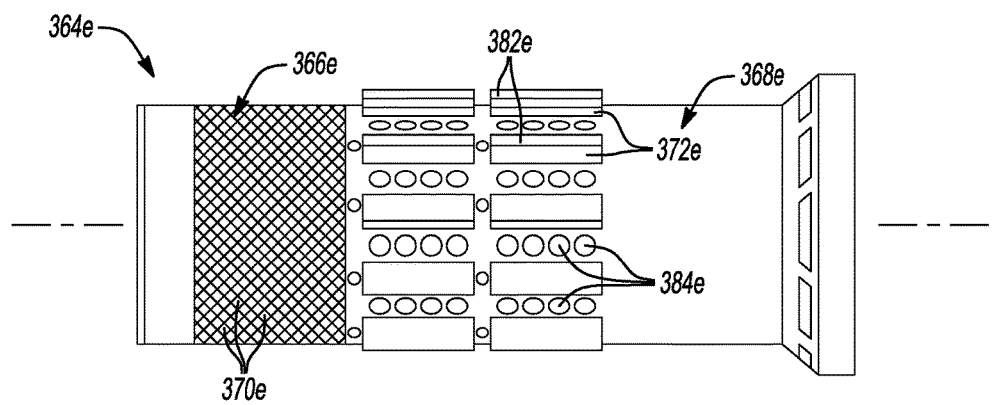
FIG. 32 is a side view of another mixer according to the principles of the present disclosure.

With reference to FIG. 32, an inner housing 364e for another mixer assembly is provided. The inner housing 364e includes a mesh portion 366e and a non-mesh portion 368e. The mesh portion 366e includes a first plurality of openings 370e and the non-mesh portion 368e includes a second plurality of openings 372e. The non-mesh portion 368e also includes a plurality of blades 382e, each blade 382e being associated with a respective opening 372e of the second plurality. The blades 382e extend radially-outward. The non-mesh portion 368e further includes a third plurality of openings 384e having a different shape than the openings 372e of the second plurality.

Figure 33:
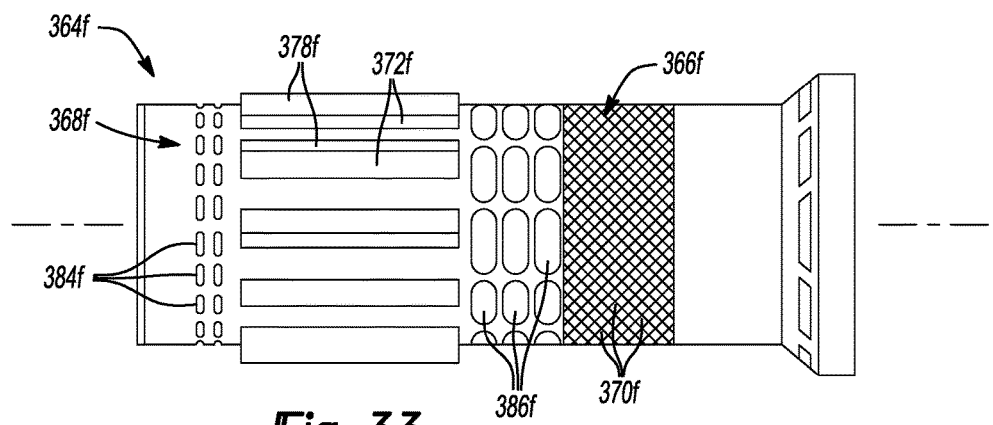
FIG. 33 is a side view of another mixer according to the principles of the present disclosure.

Referring to FIG. 33, an inner housing 364f for another mixer assembly is provided. The inner housing 364f includes a mesh portion 366f and a non-mesh portion 368f. The mesh portion 366f includes a first plurality of openings 370f. The non-mesh portion 368f also includes a second plurality of openings 372f and respective plurality of louvers 378f. The louvers 378f extend radially-outward. The non-mesh portion 368f further includes a third plurality of openings or scavenging holes 384f and a fourth plurality of openings 386f, each of the second, third, and fourth pluralities of openings 372f, 384f, 386f having distinct shapes.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A mixer assembly for mixing an injected reductant with an exhaust gas output from a combustion engine, comprising:
    an outer housing including an outer wall defining an exhaust gas passageway configured to receive exhaust gas from the engine;
    a tubular inner housing at least partially disposed within the outer housing, the inner housing including a longitudinal axis, a first end, a peripheral wall at least partially formed by wire mesh and at least partially defined by an interior of the inner housing, and an outlet disposed at a second end of the inner housing opposite the first end of the inner housing; and
    an injector fixed to one of the inner housing and the outer housing, the injector being configured to dose the reductant into the interior of the inner housing, wherein the wire mesh includes a plurality of openings configured to receive at least a portion of the exhaust gas within the outer housing and downstream of the injector, and the outlet of the inner housing is configured to discharge a mixture of the exhaust gas and the reductant.

2. The mixer assembly of claim 1, wherein the wire mesh of the peripheral wall has a first density at a first axial location and a second density at a second distinct axial location, the first density being distinct from the second density.

3. The mixer assembly of claim 1, wherein the wire mesh of the peripheral wall has a first density at a first circumferential location and a second density at a second distinct circumferential location, the first density being distinct from the second density.

4. The mixer assembly of claim 1, wherein the peripheral wall is a first peripheral wall and the inner housing further comprises a second peripheral wall that is at least partially formed by wire mesh, the first peripheral wall being disposed radially-inside the second peripheral wall, the wire mesh of the first peripheral wall having a first density and the wire mesh of the second peripheral wall having a second distinct density.

5. The mixer assembly of claim 1, wherein the peripheral wall includes first and second axially-spaced sections distributed along the longitudinal axis, the first section being disposed adjacent to the first end of the inner housing and the second section being disposed adjacent to the second end of the inner housing, one of the first section and the second section being formed from the wire mesh.

6. The mixer assembly of claim 5, wherein the first section is formed by the wire mesh and includes a plurality of scavenging holes having a first dimension that is greater than a second dimension of an opening of the wire mesh.

7. The mixer assembly of claim 1, wherein the peripheral wall includes first and second circumferentially-spaced sections, at least one of the first section and the second section being formed by the wire mesh.

8. The mixer assembly of claim 1, wherein the peripheral wall has a first length in an axial direction parallel to the longitudinal axis, the peripheral wall includes a window enclosed by the wire mesh, the window has a second length in the axial direction, the second length being less than the first length, and the window has an arc length in a circumferential direction about the longitudinal axis, the arc length being less than a circumference of the peripheral wall.

9. The mixer assembly of claim 1, wherein the plurality of openings of the wire mesh is a first plurality of openings, the peripheral wall includes a first section formed by the wire mesh and a second section, and the second section includes a second plurality of openings configured to receive a portion of the exhaust gas, within the outer housing and downstream of the injector.

10. The mixer assembly of claim 9, wherein the inner housing further includes a plurality of blades, each blade being associated with a respective opening of the second plurality of openings and extending radially-outward from the second section of the peripheral wall.

11. The mixer assembly of claim 9, wherein the inner housing further includes a plurality of deflectors, each deflector being associated with a respective opening of the second plurality of openings and extending radially-inward from the second section of the peripheral wall.

12. The mixer assembly of claim 1, wherein the peripheral wall is cylindrically shaped.

13. The mixer assembly of claim 1, wherein the peripheral wall is frustoconically shaped.

14. A mixer assembly for mixing an injected reductant with an exhaust gas output from a combustion engine, comprising:
    an outer housing including a wall defining an exhaust gas passageway configured to receive exhaust gas from the engine;
    a tubular inner housing at least partially disposed within the outer housing, the inner housing including a longitudinal axis, a first end, an outlet disposed at a second end of the inner housing opposite the first end of the inner housing, a first peripheral wall at least partially formed by wire mesh, the first peripheral wall or the wire mesh including a first plurality of openings, and a second peripheral wall that includes a second plurality of openings, the first peripheral wall being disposed inside the second peripheral wall; and
    an injector fixed to one of the inner housing or the outer housing, the injector being configured to dose the reductant into an interior of the inner housing, wherein the first and second pluralities of openings are configured to receive at least a portion of the exhaust gas within the outer housing and downstream of the injector, and the outlet of the inner housing is configured to discharge a mixture of the exhaust gas and the reductant.

15. The mixer assembly of claim 14, wherein the inner housing further includes a plurality of blades, each blade being associated with a respective opening of the second plurality of openings and extending radially-outward from the second peripheral wall.

16. The mixer assembly of claim 14, wherein the inner housing further includes a plurality of deflectors, each deflector being associated with a respective opening of the second plurality of openings and extending radially-inward from the second peripheral wall.

17. A mixer assembly for mixing an injected reductant with an exhaust gas output from a combustion engine, comprising:
an outer housing including an outer wall defining an exhaust gas passageway configured to receive exhaust gas from the engine;
a tubular inner housing at least partially disposed within the outer housing, the inner housing including a longitudinal axis, a first end, an outlet disposed at a second end of the inner housing opposite the first end of the inner housing, a first portion disposed adjacent to the first end, and a second portion disposed between the first portion and the second end, at least one of the first portion and the second portion being at least partially formed by wire mesh; and
an injector fixed to one of the inner housing and the outer housing, the injector being configured to dose the reductant into an interior of the inner housing, wherein the second portion includes a plurality of openings configured to receive at least a portion of the exhaust gas within the outer housing and downstream of the injector, and the outlet of the inner housing is configured to discharge a mixture of the exhaust gas and the reductant.

18. The mixer assembly of claim 17, wherein the first portion is formed by the wire mesh and the second portion further includes a plurality of louvres, each louvers being associated with a respective opening.

19. The mixer assembly of claim 17, wherein the first portion includes a plurality of apertures, the second portion includes first and second peripheral walls, the first peripheral wall is formed by the wire mesh and is disposed radially-inside the second peripheral wall, and the plurality of openings includes a first plurality of openings defined by the wire mesh and a second plurality of openings formed in the second peripheral wall.

20. The mixer assembly of claim 17, wherein the first portion is cylindrically shaped and the second portion is frustoconically shaped.

* * * * *